(12) United States Patent
Gross

(10) Patent No.: US 7,104,757 B2
(45) Date of Patent: Sep. 12, 2006

(54) COOLED TURBINE BLADE

(75) Inventor: Heinz-Jürgen Gross, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 105 days.

(21) Appl. No.: 10/902,655

(22) Filed: Jul. 29, 2004

(65) Prior Publication Data

US 2005/0084370 A1    Apr. 21, 2005

(30) Foreign Application Priority Data

Jul. 29, 2003    (DE)    ................... 103 34 899
Oct. 17, 2003    (EP)    ................... 03023643

(51) Int. Cl.
*F01D 5/08*    (2006.01)

(52) U.S. Cl. .................... 416/97 R; 415/115

(58) Field of Classification Search ................ 415/115, 415/119; 416/97 R, 97 A, 232, 233
See application file for complete search history.

(56) References Cited

U.S. PATENT DOCUMENTS

| | | | |
|---|---|---|---|
| 4,474,532 A | 10/1984 | Pazder | |
| 4,753,575 A | 6/1988 | Levengood et al. | |
| 4,767,268 A | 8/1988 | Auxier et al. | |
| 5,403,159 A * | 4/1995 | Green et al. | 416/97 R |
| 5,462,405 A | 10/1995 | Hoff et al. | |
| 5,603,606 A * | 2/1997 | Glezer et al. | 416/97 R |
| 5,857,837 A | 1/1999 | Zelesky et al. | |
| 5,873,695 A | 2/1999 | Takeishi et al. | |
| 5,902,093 A | 5/1999 | Liotta et al. | |
| 6,139,269 A | 10/2000 | Liang | |
| 6,431,832 B1 | 8/2002 | Glezer et al. | |
| 6,595,748 B1 * | 7/2003 | Flodman et al. | 416/97 R |

FOREIGN PATENT DOCUMENTS

| | | |
|---|---|---|
| DE | 32 34 906 A1 | 6/1983 |
| DE | 199 63 716 A1 | 7/2001 |
| EP | 1 022 434 A2 | 7/2000 |

* cited by examiner

*Primary Examiner*—Igor Kershteyn

(57) ABSTRACT

The invention relates to a turbine blade which has a nose cavity in the region of a leading edge, it being possible for the leading edge to be cooled by impingement cooling, which has an inner cavity at least partly of meander-shaped design, and which has a crown pocket as cavity in the region of the blade tip, which crown pocket is connected to the nose cavity, so that the cooling of the turbine blade is improved.

22 Claims, 3 Drawing Sheets

COOLED TURBINE BLADE

CROSS REFERENCE TO RELATED APPLICATION

This application claims priority of the European application No. 03023643.4 EP filed Oct. 17, 2003 under the European Patent Convention and German application No. 10334899.9 DE filed Jul. 29, 2003, both of which are incorporated by reference herein in their entirety.

FIELD OF THE INVENTION

The invention relates to a coolable turbine blade as claimed in claim 1.

BACKGROUND OF THE INVENTION

Internally cooled turbine blades which have a meander-shaped inner region (EP 1 022 434 A2) and impingement cooling are known.

The impingement cooling in the interior of turbine blades is likewise known.

DE 32 34 906 A1, U.S. Pat. Nos. 5,857,837, 5,873,695, 5,902,093, 5,462,405, 6,139,269 show a turbine blade whose leading edge is cooled by impingement cooling.

DE 199 63 716 A1, U.S. Pat. Nos. 4,474,532, 4,753,575 and 4,767,268 show a turbine blade which has a cavity in the region of its blade tip.

U.S. Pat. No. 6,431,832 shows a turbine blade which has a cavity in the region of its blade tip and a cavity in the region of its leading edge.

However, the effectiveness of the cooling in the region of the leading edge of a turbine blade is inadequate.

SUMMARY OF THE INVENTION

It is therefore the object of the invention to show a turbine blade in which the cooling of the leading edge is improved.

The object is achieved by a turbine blade as claimed in the claims, in which the leading edge is cooled by impingement cooling and in which there is a crown pocket (cavity in the region of the blade tip).

Further advantageous configurations of the turbine blade are listed in the subclaims. The measures listed in the subclaims can be combined with one another in an advantageous manner.

DETAILED DESCRIPTION OF THE INVENTION

Figure 1:
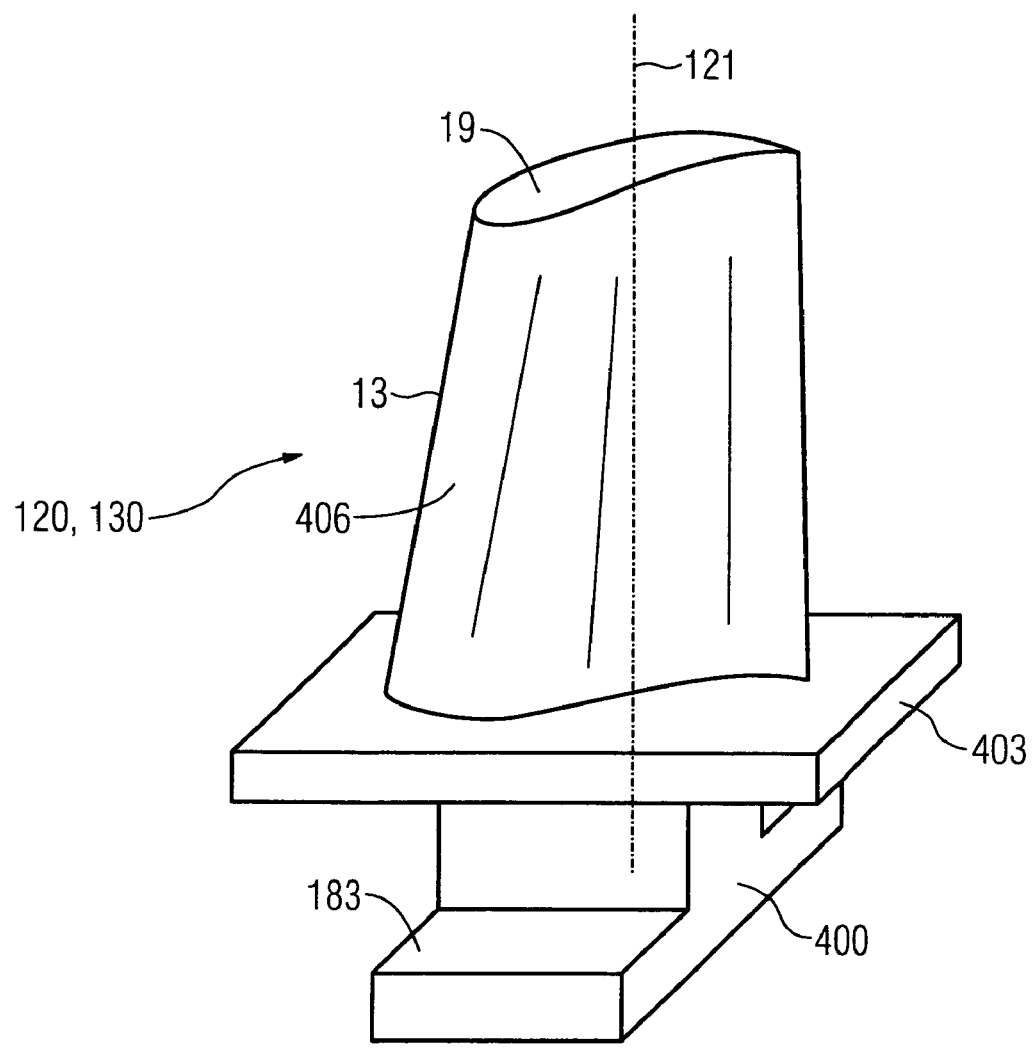
FIG. 1 shows a turbine blade.

FIG. 1, in a perspective view, shows a blade 120, 130 (FIG. 3) which extends along a longitudinal axis 121 (radial direction).

The blade 120, 130 has, following one another along the longitudinal axis 121, a fastening region 400, an adjoining blade platform 403, a blade airfoil region 406 and a blade tip 19.

The blade airfoil region 406 is subjected to the flow of a medium at a leading edge 13.

Figure 3:
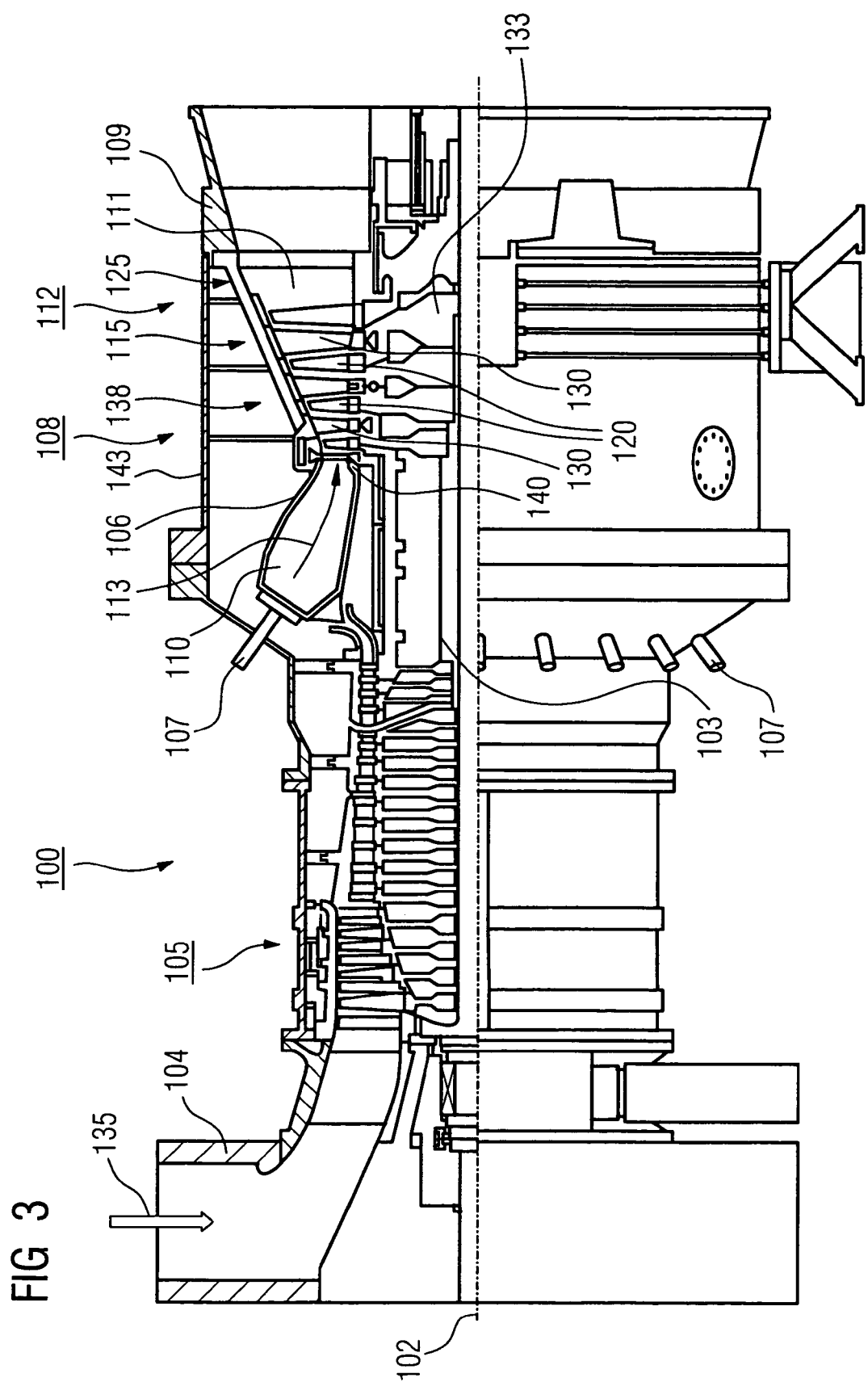
FIG. 3 shows a gas turbine in which the turbine blade designed according to the invention is used.

Formed in the fastening region 400 is a blade root 183 which serves to fasten the moving blades 120, 130 to the shaft 103 (FIG. 3). The blade root 183 is of hammerhead configuration. Other configurations, for example as a fir-tree or dovetail root, are possible. In the case of conventional blades 120, 130, solid metallic materials are used in all the regions 400, 403, 406 of the moving blade 120, 130.

In this case, the moving blade 120, 130 may be produced by a casting process, by a forging process, by a milling process or by combinations thereof.

Figure 2:
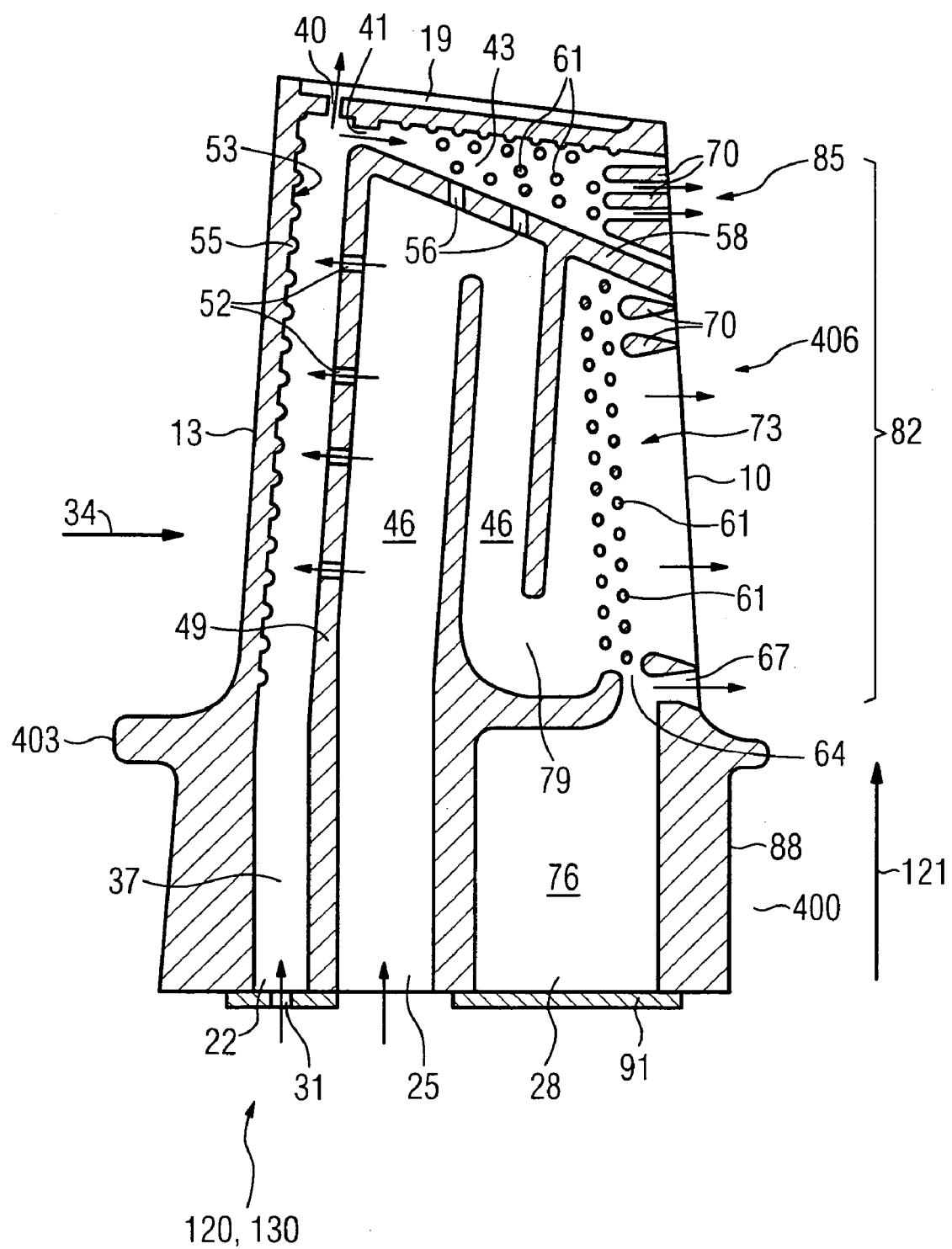
FIG. 2 shows a cross section of a turbine blade.

FIG. 2 shows such a turbine blade 120, 130 in longitudinal section.

A turbine moving blade 120 or turbine guide blade 130 of a gas turbine (FIG. 3, but also an aircraft turbine) or steam turbine is depicted in FIG. 2. The turbine blade 120, 130 is at least partly of hollow design and is cooled in the interior.

In the blade root region 400, the turbine blade 120, 130 has at least one first coolant inlet region 22, a second coolant inlet region 25 and a third coolant inlet region 28.

The coolant inlet regions 22, 25, 28 may optionally be closed (here 28 for example) or may have a constriction 31 (here at the coolant inlet region 22 for example), by means of which a coolant flow into the interior can be set. The constriction 31 may also be regulated, i.e. enlarged or reduced during operation. In this exemplary embodiment, the third coolant inlet region 28 is completely closed and the first coolant inlet region 25 is constricted. The coolant flows through the first and second coolant inlet regions 22, 25 into the interior of the turbine blade 120, 130. A hot medium flows around the turbine blade 120, 130 in axial direction 34. The hot medium first of all strikes the leading edge 13 (blade nose) in axial direction 34 and then flows past the blade airfoil 406 up to the trailing edge 10. The coolant, which passes through the first coolant inlet region 22 into a nose cavity 37 following directly behind the leading edge 13 in axial direction 34, flows in radial direction 121 up to the blade tip 19. The nose cavity 37 runs, for example, parallel to the leading edge 13. For example, although not necessarily the case, there may be at least one outlet opening 40 for the coolant in the region of the blade tip 19 and of the leading edge 13, so that film cooling of the blade tip may be effected. In any case, the coolant flows through at least one connecting opening 41 into a crown pocket 43 (cavity in the region of the blade tip 19) and cools the blade tip 19 there over its length in axial direction 34. The crown pocket 43 extends from the nose cavity 37 up to the trailing edge 10. The extent of the crown pocket 43 in radial direction 121 widens, for example, in axial direction 34. In the region of the trailing edge 10, this portion of the coolant leaves by means of the turbine blade 120, 130.

Coolant likewise always flows through the second coolant inlet region 25 into an inner cavity 46 which adjoins the nose cavity 37 in axial direction 34. The inner cavity 46 is designed, for example, at least partly in a meander shape, preferably entirely in a meander shape, so that some of the coolant flows in a meander shape in the interior of the turbine blade 120, 130 toward the region of the trailing edge 10 and discharges from the turbine blade 120, 130 at least partly over the length of the trailing edge 10. The inner cavity 46 is separated from the nose cavity 37 in radial direction 121 by a wall 49. There are as many impingement cooling openings 52 as possible in the wall 49, these impingement cooling openings 52 being as small as possible. The coolant flows out of the inner cavity 46 through the impingement cooling openings 52 into the nose cavity 37, strikes the inner wall surface 53 of the leading edge 13 there and cools the latter by means of impingement cooling. Provided on the inner wall surface 53 which is struck by the coolant is, for example, at least one prominence, in particular many small prominences 55 which serve to swirl the cooing medium.

The coolant (air or steam) which flows through the impingement openings 52 into the nose cavity 37 flows, if need be together with the coolant which has flowed in through the first coolant inlet region 22, through the at least one connecting opening 41 into the crown pocket 43 and/or outward through the first outlet opening 40. The first coolant inlet region 22 may also be completely closed, so that coolant only penetrates into the nose cavity 37 from the inner cavity 46.

A transverse web 58 separates the inner cavity 46 from the crown pocket 43 in axial direction 34. Likewise, coolant can penetrate into the nose pocket 43 from the meander-shaped region 46 through at least one, in particular two or more second outlet openings 56 in the transverse web 58 (for example also as impingement cooling).

The transverse web 58 runs in axial direction 34 or, as in FIG. 2, at a certain angle to the axial direction 34, since the crown pocket 43 widens in axial direction 34.

The third natural mode of a blade vibration can be displaced to higher frequencies by the position and/or thickness of the transverse web 58. Stresses at the rear edge 88 close to the fastening region can easily be influenced by holes (not shown) in the third coolant inlet region 28.

No film cooling is used in the turbine blade 120, 130 at least in the region of the leading edge 13, since according to the invention it is cooled in a greatly improved manner in the interior by the arrangement of nose cavity 37, crown pocket 43 and inner cavity 46. Film cooling may be used in the region of the trailing edge 10, but does not have to be used, since cooling air is saved by the invention and the efficiency of the turbine is increased.

The transverse web 58 can also be additionally cooled by the second outlet openings 56 in the transverse web 58.

Both in the crown pocket 43 and in the region of the trailing edge 10, there are webs 61 which run in the interior between the two sides of the blade airfoil 406. The webs 61 serve to swirl the flowing coolant. The webs 61 are, for example, uniformly distributed in the crown pocket 43. For example, two staggered rows of webs 61 run in radial direction 121 in the region of the trailing edge 10. This also enables the coolant, which flows out of a meander end 79, to be distributed over the length of the trailing edge 10. The outflow region 82 of the turbine blade 120, 130 in the region of the trailing edge 10 is composed of the outflow region 73 of the inner cavity 46 and the outflow region 85 of the crown pocket 43.

If a cover 91 is absent or if it has suitable through-holes, the coolant flows, for example, through the third coolant inlet region 28 into a root cavity 76 (extending, for example, up to the blade platform 403, that is in the blade root 400) and through a third outlet opening 64 into the outflow region 73 of the inner cavity 46 in the region of the trailing edge 10. Likewise, the coolant which has flowed in via the third coolant inlet region 28 can flow out again through a fourth outlet opening 67 directly in the region of the trailing edge 10. In both the outflow region 73 and the region of the trailing edge 10, there may be elongated webs 70 (instead of circular webs 61). "Elongated" means that they extend in axial direction 34 in radial cross section.

Here, the entire cavity of the turbine blade 120, 130 is formed, for example, by the nose cavity 37, the crown pocket 43, the inner cavity 46 and the root cavity 76.

By way of example, FIG. 3 shows a gas turbine 100 in a longitudinal partial section. In the interior, the gas turbine 100 has a rotor 103 which is rotationally mounted about a rotation axis 102 and is also referred to as turbine impeller. Following one another along the rotor 103 are an intake casing 104, a compressor 105, a, for example toroidal, combustion chamber 110, in particular an annular combustion chamber 106, having a plurality of coaxially arranged burners 107, a turbine 108 and the exhaust-gas casing 109. The annular combustion chamber 106 communicates with a, for example annular, hot-gas duct 111. There, for example, four turbine stages 112 connected one behind the other form the turbine 108. Each turbine stage 112 is formed from two blade rings.

As viewed in the direction of flow of the working medium 113, a row 125 formed of moving blades 120 follows a guide blade row 115 in the hot-gas duct 111.

In this case, the guide blades 130 (FIG. 2) are fastened to an inner casing 138 of a stator 143, whereas the moving blades 120 (FIG. 2) of a row 125 are attached to the rotor 133, for example by means of a turbine disk 133. Coupled to the rotor 103 is a generator or a driven machine (not shown).

During operation of the gas turbine 100, air 135 is drawn in through the intake casing 104 and compressed by the compressor 105. The compressed air provided at the turbine-side end of the compressor 105 is directed to the burners 107 and is mixed there with a combustion medium. The mixture is then burned, with the working medium being formed in the combustion chamber 110. From there, the working medium 113 flows along the hot-gas duct 111 past the guide blades 130 and the moving blades 120. The working medium 113 expands at the moving blades 120 in such a way as to transmit an impulse, so that the moving blades 120 drive the rotor 103 and the latter drives the driven machine coupled to it.

During operation of the gas turbine 100, the components exposed to the hot working medium 113 are subjected to thermal loads. The guide blades 130 and moving blades 120 of the first turbine stage 112 as viewed in the direction of flow of the working medium 113, in addition to the heat shield tiles lining the annular combustion chamber 106, are subjected to the greatest thermal loading. In order to withstand the temperatures prevailing there, said guide blades 130 and moving blades 120 are cooled by means of a coolant (see FIG. 2). Likewise, the substrates may have a directional structure, i.e. they are single-crystalline (SX structure) or have only longitudinally directed grains (DS structure). Iron-, nickel- or cobalt-based superalloys are used as the material. For example, superalloys are used as have been disclosed by EP 1204776, EP 1306754, EP 1319729, WO 99/67435 or WO 00/44949; these publications are part of the disclosure.

Likewise, the blades 120, 130 may have coatings resistant to corrosion (MCrAlX; M is at least one element of the group of iron (Fe), cobalt (Co), nickel (Ni), x stands for yttrium (Y) and/or at least one element or the rare earths) and to heat by means of a heat-insulating layer. The heat-insulating layer consists, for example, of $ZrO_2$, $Y_2O_4$—$ZrO_2$, i.e. it is not partially or fully stabilized by yttrium oxide and/or calcium oxide and/or magnesium oxide.

Columnar grains are produced in the heat-insulating layer by suitable coating processes, such as, for example, electron beam physical vapor deposition (EB PVD).

The guide blade 130 has a guide blade root (not shown here), facing the inner casing 138 of the turbine 108, and a guide blade tip opposite the guide blade root. The guide blade tip faces the rotor 103 and is secured to a fastening ring 140 of the stator 143.

The invention claimed is:

1. A turbine blade for a gas turbine, comprising:
   a leading edge;
   a nose cavity located near the leading edge adapted to transfer coolant from a base of the blade toward a blade tip, wherein the nose cavity has a first coolant inlet reagion in a blade root such that a first coolant flow can flow into the nose cavity;
   a crown pocket cavity located near the blade tip and connected to the nose cavity and adapted to transfer coolant from the leading edge toward a trailing edge of the blade;
   an inner cavity with a portion having a meandering shape design, wherein the inner cavity has a second coolant inlet region in the blade root such that a second coolant flow, distinct from the first coolant flow, can flow into the inner cavity, and
   a wall separating the inner cavity and the nose cavity, the wall comprising a plurality of impingement cooling openings that cool the leading edge.

2. The turbine blade as claimed in claim 1, wherein a wall surface of the nose cavity, having a prominence in the nose cavity, is impinged by the coolant after the coolant has passed through the impingement cooling openings.

3. The turbine blade as claimed in claim 1, wherein there is a first outlet opening in the region of the leading edge and the blade tip such that a portion of the first and the second coolant can discharge outward from the nose cavity.

4. The turbine blade as claimed in claim 1, wherein the nose cavity is connected to the crown pocket by an opening such that a coolant can flow into the crown pocket from the nose cavity.

5. The turbine blade as claimed in claim 1, wherein the crown pocket widens in a radial direction from the nose cavity toward a trailing edge of the turbine blade.

6. The turbine blade as claimed in claim 1, wherein the crown pocket and the inner cavity are separated by a transverse web having an opening such that a portion at the second coolant flow can flow there through.

7. The turbine blade as claimed in claim 6, wherein a natural mode of a blade vibration of the turbine blade can be adjusted by the position and thickness of the transverse web.

8. The turbine blade as claimed in claim 1, wherein the nose cavity is located between an inner surface of the leading edge and the wall.

9. The turbine blade as claimed in claim 6, wherein the crown pocket is located between the blade tip and the transverse web.

10. The turbine blade as claimed in claim 1, wherein no film cooling is used.

11. The turbine blade as claimed in claim 1, wherein no film cooling is used in the region of the leading edge.

12. A cooled gas turbine blade, comprising:
    a blade root portion;
    a blade platform portion;
    a blade airfoil portion having a leading edge and a trailing edge;
    a nose cavity located between an inner wall and an inner surface of the leading edge, an inner surface of the platform portion, and an inner surface of the blade root portion, and wherein the nose cavity has a first coolant inlet region in the blade root portion such that a first coolant flow can flow into the nose cavity;
    an inner cavity having a meandering shape, wherein the inner cavity has a second coolant inlet region in the blade root portion such that a second coolant flow, separate from the first coolant flow, can flow into the inner cavity; and
    a plurality of impingement cooling openings in the inner wall directed toward the inner surface of the leading edge,
    wherein only a portion of the second coolant flow passes through the impingement cooling openings into the nose cavity.

13. The cooled turbine blade as claimed in claim 12, further comprising a crown pocket cavity located near a blade tip and connected to the nose cavity.

14. The turbine blade as claimed in claim 13, wherein the crown pocket and the inner cavity are separated by a transverse web having an opening such that a portion of the second coolant flow can flow there through.

15. The turbine blade as claimed in claim 14, wherein a natural mode of a blade vibration of the turbine blade can be adjusted by the position and thickness of the transverse web.

16. The cooled turbine blade as claimed in claim 12, wherein the inner surface of the leading edge has a prominence.

17. The cooled turbine blade as claimed in claim 12, wherein there is a first outlet opening in the region of the leading edge and the blade tip such that a portion of the first and the second coolant can discharge outward from the nose cavity.

18. The cooled turbine blade as claimed in claim 13, wherein the nose cavity is connected to the crown pocket by an opening such that a coolant can flow into the crown pocket from the nose cavity.

19. The turbine blade as claimed in claim 13, wherein the crown pocket widens in a radial direction from the nose cavity toward a trailing edge of the turbine blade.

20. The turbine blade as claimed in claim 12, wherein no film cooling is used.

21. The turbine blade as claimed in claim 12, wherein no film cooling is used in the region of the leading edge.

22. A turbine, comprising: a cooled turbine blade, comprising: a leading edge; a nose cavity in the region of the leading edge located between an inner wall and an inner surface of the leading edge, wherein the nose cavity has a first coolant inlet region in a blade root portion of the cooled turbine blade such that a first coolant flow can flow into the nose cavity; a crown pocket cavity in the region of a blade tip of the turbine blade and connected to the nose cavity; an inner cavity having a meandering shape, wherein the inner cavity has a second coolant inlet region in the blade root portion such that a second coolant flow, distinct from the first coolant flow, can flow into the inner cavity; and a plurality of impingement cooling openings in the inner wall that cool the leading edge.

* * * * *